US012687855B2

(12) United States Patent
Kurose Nishimura et al.

(10) Patent No.: US 12,687,855 B2
(45) Date of Patent: Jul. 21, 2026

(54) BIRD'S-EYE DATA GENERATION DEVICE, LEARNING DEVICE, BIRD'S-EYE DATA GENERATION PROGRAM, BIRD'S-EYE DATA GENERATION METHOD, AND ROBOT

(71) Applicants: OMRON CORPORATION, Kyoto (JP); KYOTO UNIVERSITY, Kyoto (JP)

(72) Inventors: Mai Kurose Nishimura, Tokyo (JP); Shohei Nobuhara, Kyoto (JP); Ko Nishino, Kyoto (JP)

(73) Assignees: OMRON CORPORATION, Kyoto (JP); KYOTO UNIVERSITY, Kyoto (JP)

( * ) Notice: Subject to any disclaimer, the term of this patent is extended or adjusted under 35 U.S.C. 154(b) by 17 days.

(21) Appl. No.: 18/845,102

(22) PCT Filed: Mar. 14, 2023

(86) PCT No.: PCT/JP2023/009949
§ 371 (c)(1),
(2) Date: Sep. 9, 2024

(87) PCT Pub. No.: WO2023/176854
PCT Pub. Date: Sep. 21, 2023

(65) Prior Publication Data
US 2025/0181071 A1 Jun. 5, 2025

(30) Foreign Application Priority Data

Mar. 15, 2022 (JP) ................................ 2022-039936
Feb. 15, 2023 (JP) ................................ 2023-022034

(51) Int. Cl.
*G06T 7/70* (2017.01)
*G05D 1/24* (2024.01)
(Continued)

(52) U.S. Cl.
CPC ............... *G05D 1/24* (2024.01); *G05D 1/646* (2024.01); *G06T 7/20* (2013.01); *G06T 7/70* (2017.01);
(Continued)

(58) Field of Classification Search
CPC ...... G05D 1/24; G05D 1/646; G05D 2101/15; G05D 2111/10; G05D 1/243;
(Continued)

(56) References Cited

U.S. PATENT DOCUMENTS 11,210,533 B1 * 12/2021 Cha ......................... G06V 20/58
11,380,108 B1 * 7/2022 Cai ......................... G06V 20/58
(Continued)

FOREIGN PATENT DOCUMENTS

JP 2019-067174 A 4/2019
JP 2021-077287 A 5/2021
(Continued)

OTHER PUBLICATIONS

Bertoni et al., "MonoLoco: Monocular 3D Pedestrian Localization and Uncertainty Estimation," searchable on the internet at <URL: https://arxiv.org/abs/1906.06059> (2019).
(Continued)

*Primary Examiner* — Tarek Elarabi
(74) *Attorney, Agent, or Firm* — Morgan, Lewis & Bockius LLP

(57) ABSTRACT

The present disclosure provides a bird's-eye data generating device with an acquiring section acquiring time-series data; and a generating section generating bird's-eye data.

6 Claims, 13 Drawing Sheets

(51) Int. Cl.

| | |
|---|---|
| *G05D 1/646* | (2024.01) |
| *G05D 101/15* | (2024.01) |
| *G05D 111/10* | (2024.01) |
| *G06T 7/20* | (2017.01) |

(52) U.S. Cl.
CPC ...... *G05D 2101/15* (2024.01); *G05D 2111/10* (2024.01); *G06T 2207/20081* (2013.01); *G06T 2207/20084* (2013.01)

(58) Field of Classification Search
CPC ...... G05D 2109/10; G05D 1/633; G06T 7/20; G06T 7/70; G06T 2207/20081; G06T 2207/20084; G06T 3/00; G06V 10/82; G06V 20/56; G06V 40/10
See application file for complete search history.

(56) References Cited

U.S. PATENT DOCUMENTS

| | | | | |
|---|---|---|---|---|
| 2020/0234497 | A1 | 7/2020 | Fueki et al. | |
| 2022/0169245 | A1* | 6/2022 | Hieida | G08G 1/162 |
| 2022/0397903 | A1 | 12/2022 | Kurose et al. | |
| 2023/0260266 | A1* | 8/2023 | Karasev | G01S 13/931 |
| | | | | 382/104 |

FOREIGN PATENT DOCUMENTS

| | | |
|---|---|---|
| JP | 2021-163096 A | 10/2021 |
| WO | 2020/202741 A1 | 10/2020 |

OTHER PUBLICATIONS

Yang et al., "CubeSLAM: Monocular 3D Object SLAM," searchable on the internet at <URL: https://arxiv.org/abs/1806.00557> (2018).

Nagatani, "The Current State of and an Outlook on Field Robotics," searchable on the internet at <URL: https://committees.jsce.or.jp/opcet_sip/system/files/0130_01.pdf> (2020).

Shibayama et al., "Acquisition of Pedestrian Trajectory around Vehicle Using On-board Camera," IEICE Technical Report, 111(63): 13-18 (2011).

International Search Report and Written Opinion dated May 23, 2023, for corresponding International Patent Application No. PCT/JP2023/009949.

Hu et al., FIERY: Future Instance Prediction in Bird's-Eye View from Surround Monocular Cameras, 2021 IEEE/CVF International Conference on Computer Vision (ICCV), IEEE, 2021, pp. 15253-15262.

Philion et al., "Lift, Splat, Shoot: Encoding Images from Arbitrary Camera Rigs by Implicitly Unprojecting to 3D", Proceedings of the European Conference on Computer Vision (ECCV), 2020, pp. 194-210.

Qiu et al., "Egocentric Human Trajectory Forecasting with a Wearable Camera and Multi-Modal Fusion", Arxiv.Org, Cornell University, 2021, 8 pages.

Extended European Search Report issued in corresponding European Patent Application No. 23770807.8, dated Mar. 5, 2026.

\* cited by examiner

BIRD'S-EYE DATA GENERATION DEVICE, LEARNING DEVICE, BIRD'S-EYE DATA GENERATION PROGRAM, BIRD'S-EYE DATA GENERATION METHOD, AND ROBOT

TECHNICAL FIELD

The technique of the present disclosure relates to a bird's-eye data generating device, a training device, a bird's-eye data generating program, a bird's-eye data generating method, and a robot.

BACKGROUND ART

There is conventionally known a technique of estimating the distribution of positions of persons as seen from a bird's-eye viewpoint, on the basis of skeletons of the persons that are observed in images captured from a first person viewpoint ("MonoLoco: Monocular 3D Pedestrian Localization and Uncertainty Estimation", searchable on the internet at <URL: https://arxiv.org/abs/1906.06059>, June 2019).

Further, there is known a technique of carrying out sequential optimization by adding moving bodies to targets of optimization in self-position estimation (Simultaneous Localization and Mapping: SLAM) that is based on a static landmark ("CubeSLAM: Monocular 3D Object SLAM", searchable on the internet at <URL: https://arxiv.org/abs/1806.00557>, June 2018).

Moreover, techniques of estimating positions by GNSS (Global Navigation Satellite System) are known ("The Current State of and an Outlook on Field Robotics", searchable on the internet at <URL: https://committees.jsce.or.jp/opcet_sip/system/files/0130_01.pdf>).

Further, there is known a technique of estimating the position of capturing first person images within bird's-eye viewpoint images (Japanese Patent Application Laid-Open (JP-A) No. 2021-77287). This technique carries out comparison of motion characteristics extracted from both a bird's-eye viewpoint and a first person viewpoint, for the estimation.

SUMMARY OF INVENTION

Technical Problem

However, in the technique of the above "MonoLoco: Monocular 3D Pedestrian Localization and Uncertainty Estimation", searchable on the internet at <URL: https://arxiv.org/abs/1906.06059>, June 2019), the motion of the observing camera and the loci of movement of moving bodies at the periphery thereof cannot be reconstructed.

Further, the technique of the above "CubeSLAM: Monocular 3D Object SLAM", searchable on the internet at <URL: https://arxiv.org/abs/1806.00557>, June 2018 is applicable only to environments in which moving bodies as well as a static landmark can be observed stably. Further, the motion model of the moving bodies is limited to simple rigid-body motions, and cannot handle motions of moving bodies that take interactions into consideration.

Further, in the technique of the above "The Current State of and an Outlook on Field Robotics", searchable on the internet at <URL: https://committees.jsce.or.jp/opcet_sip/system/files/0130_01.pdf>), the subject thereof is only the reconstruction of the self-position of the device itself that is equipped with a GNSS, and positions of peripheral moving bodies cannot be reconstructed. Moreover, in environments in which blocking due to high-rise buildings or the like arises, the reception of GPS (Global Positioning System) radio waves is unstable, and the results of position reconstruction are inaccurate.

Further, the technique of above JP-A No. 2021-77287 cannot be applied to cases in which images from a bird's-eye viewpoint are not acquired.

The technique of the present disclosure was made in view of the above-described points, and an object thereof is to provide a bird's-eye data generating device, a training device a bird's-eye data generating program, a bird's-eye data generating method and a robot that, even in a situation in which a static landmark is not detected, can generate bird's-eye data, which expresses the on-ground locus of movement of an observing moving body equipped with an observation device and on-ground loci of movement of respective moving bodies, from two-dimensional observation information that has been observed in a dynamic environment from the viewpoint of the observing moving body.

Solution to Problem

A first aspect of the disclosure is a bird's-eye data generating device including: an acquiring section acquiring time-series data of two-dimensional observation information expressing at least one moving body observed in a dynamic environment from a viewpoint of an observing moving body equipped with an observation device; and a generating section generating bird's-eye data expressing an on-ground locus of movement of the observing moving body and on-ground loci of movement of the respective moving bodies that are obtained in a case in which the observing moving body is observed from a bird's-eye position, from the time-series data of the two-dimensional observation information and by using a trained model that estimates on-ground motion of the observing moving body and on-ground motions of the respective moving bodies.

A second aspect of the disclosure is a training device including: an acquiring section acquiring, as teacher data, combinations of time-series data of positions and sizes of respective moving bodies at respective times in two-dimensional observation information expressing at least one moving body observed in a dynamic environment from a viewpoint of an observing moving body equipped with an observation device, and time-series data of on-ground motion of the observing moving body and on-ground motions of the respective moving bodies; and a training section that, on the basis of the teacher data, trains a model whose input is the positions and sizes of the respective moving bodies at respective times in the two-dimensional observation information and that estimates on-ground motion of the observing moving body and on-ground motions of the respective moving bodies.

A third aspect of the disclosure is a bird's-eye data generating device including: an acquiring section acquiring time-series data of two-dimensional observation information expressing at least one moving body observed in a dynamic environment from a viewpoint of an observing moving body equipped with an observation device; and a generating section generating results of predicting bird's-eye data expressing an on-ground locus of movement of the observing moving body and on-ground loci of movement of respective moving bodies that are obtained in a case in which the observing moving body is observed from a bird's-eye position, from the time-series data of the two-dimensional observation information and by using a trained model that predicts on-ground motion of the observing moving body and on-ground motions of the respective moving bodies.

A fourth aspect of the disclosure is a bird's-eye data generating program for causing a computer to execute processings including: an acquiring step of acquiring time-series data of two-dimensional observation information expressing at least one moving body observed in a dynamic environment from a viewpoint of an observing moving body equipped with an observation device; and a generating step of generating bird's-eye data expressing an on-ground locus of movement of the observing moving body and on-ground loci of movement of the respective moving bodies that are obtained in a case in which the observing moving body is observed from a bird's-eye position, from the time-series data of the two-dimensional observation information and by using a trained model that estimates on-ground motion of the observing moving body and on-ground motions of the respective moving bodies.

A fifth aspect of the disclosure is a bird's-eye data generating method in which a computer executes processings including: an acquiring step of acquiring time-series data of two-dimensional observation information expressing at least one moving body observed in a dynamic environment from a viewpoint of an observing moving body equipped with an observation device; and a generating step of generating bird's-eye data expressing an on-ground locus of movement of the observing moving body and on-ground loci of movement of the respective moving bodies that are obtained in a case in which the observing moving body is observed from a bird's-eye position, from the time-series data of the two-dimensional observation information and by using a trained model that estimates on-ground motion of the observing moving body and on-ground motions of the respective moving bodies.

A sixth aspect of the disclosure is a robot including: an acquiring section acquiring time-series data of two-dimensional observation information expressing at least one moving body observed in a dynamic environment from a viewpoint of a robot equipped with an observation device; a generating section generating bird's-eye data expressing an on-ground locus of movement of the robot and on-ground loci of movement of the respective moving bodies that are obtained in a case in which the robot is observed from a bird's-eye position, from the time-series data of the two-dimensional observation information and by using a trained model that estimates on-ground motion of the robot and on-ground motions of the respective moving bodies; an autonomous traveling section causing the robot to travel autonomously; and a control section that, by using the bird's-eye data, controls the autonomous traveling section such that the robot moves to a destination.

A seventh aspect of the disclosure is a bird's-eye data generating program for causing a computer to execute processings including: an acquiring step of acquiring time-series data of two-dimensional observation information expressing at least one moving body observed in a dynamic environment from a viewpoint of an observing moving body equipped with an observation device; and a generating step of generating results of predicting bird's-eye data expressing an on-ground locus of movement of the observing moving body and on-ground loci of movement of respective moving bodies that are obtained in a case in which the observing moving body is observed from a bird's-eye position, from the time-series data of the two-dimensional observation information and by using a trained model that predicts on-ground motion of the observing moving body and on-ground motions of the respective moving bodies.

An eighth aspect of the disclosure is a bird's-eye data generating method in which a computer executes processings including: an acquiring step of acquiring time-series data of two-dimensional observation information expressing at least one moving body observed in a dynamic environment from a viewpoint of an observing moving body equipped with an observation device; and a generating step of generating results of predicting bird's-eye data expressing an on-ground locus of movement of the observing moving body and on-ground loci of movement of respective moving bodies that are obtained in a case in which the observing moving body is observed from a bird's-eye position, from the time-series data of the two-dimensional observation information and by using a trained model that predicts on-ground motion of the observing moving body and on-ground motions of the respective moving bodies.

A ninth aspect of the disclosure is a robot including: an acquiring section acquiring time-series data of two-dimensional observation information expressing at least one moving body observed in a dynamic environment from a viewpoint of a robot equipped with an observation device; a generating section generating results of predicting bird's-eye data expressing an on-ground locus of movement of the robot and on-ground loci of movement of respective moving bodies that are obtained in a case in which the robot is observed from a bird's-eye position, from the time-series data of the two-dimensional observation information and by using a trained model that predicts on-ground motion of the robot and on-ground motions of the respective moving bodies; an autonomous traveling section causing the robot to travel autonomously; and a control section that, by using the results of predicting the bird's-eye data, controls the autonomous traveling section such that the robot moves to a destination.

Advantageous Effects of Invention

In accordance with the technique of the present disclosure, even in a situation in which a static landmark is not detected, bird's-eye data, which expresses the on-ground locus of movement of an observing moving body equipped with an observation device and on-ground loci of movement of respective moving bodies, can be generated from two-dimensional observation information that has been observed in a dynamic environment from the viewpoint of the observing moving body.

DESCRIPTION OF EMBODIMENTS

Figure 1:
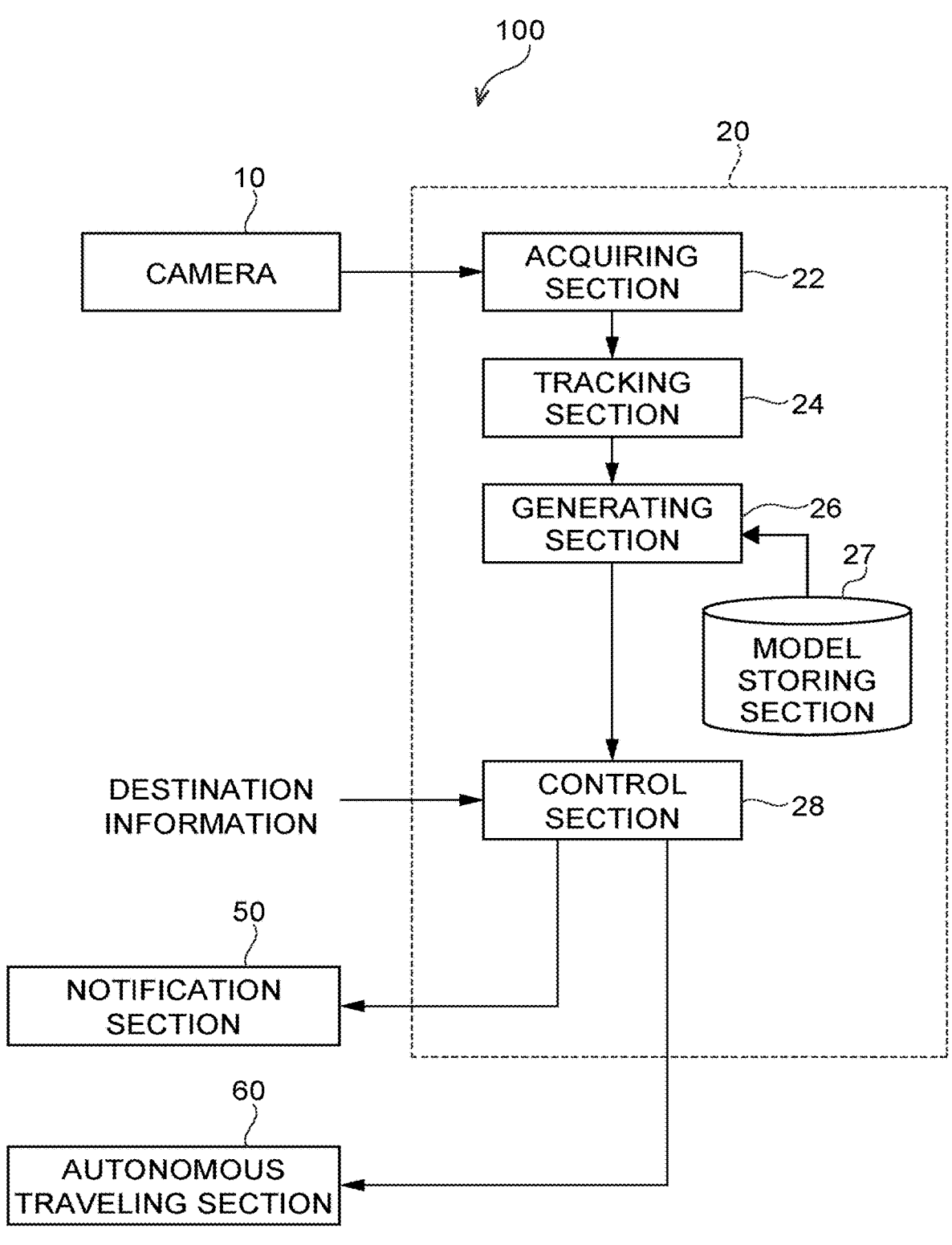
FIG. 1 is a drawing illustrating the schematic structure of a robot relating to a first embodiment.

Examples of embodiments of the technique of the present disclosure are described hereinafter with reference to the drawings. Note that, in the respective drawings, the same reference numerals are applied to structural elements and portions that are the same or equivalent. Further, there are cases in which dimensions and ratios in the drawings are exaggerated for convenience of explanation, and there are cases in which they differ from actual ratios.

First Embodiment

FIG. 1 is a drawing illustrating the schematic structure of robot 100 relating to a first embodiment of the technique of the present disclosure. As illustrated in FIG. 1, the robot 100 has a camera 10, a bird's-eye data generating device 20, a notification section 50 and an autonomous traveling section 60. The bird's-eye data generating device 20 has an acquiring section 22, a tracking section 24, a generating section 26, a model storing section 27, and a control section 28. Note that the robot 100 is an example of the observing moving body, and the camera 10 is an example of the observation device.

The camera 10 captures images of the periphery of the robot 100 at a predetermined interval and while moving from a start point to a destination, and outputs the captured images to the acquiring section 22 of the bird's-eye data generating device 20. Note that the images are an example of two-dimensional observation information.

Figure 2:
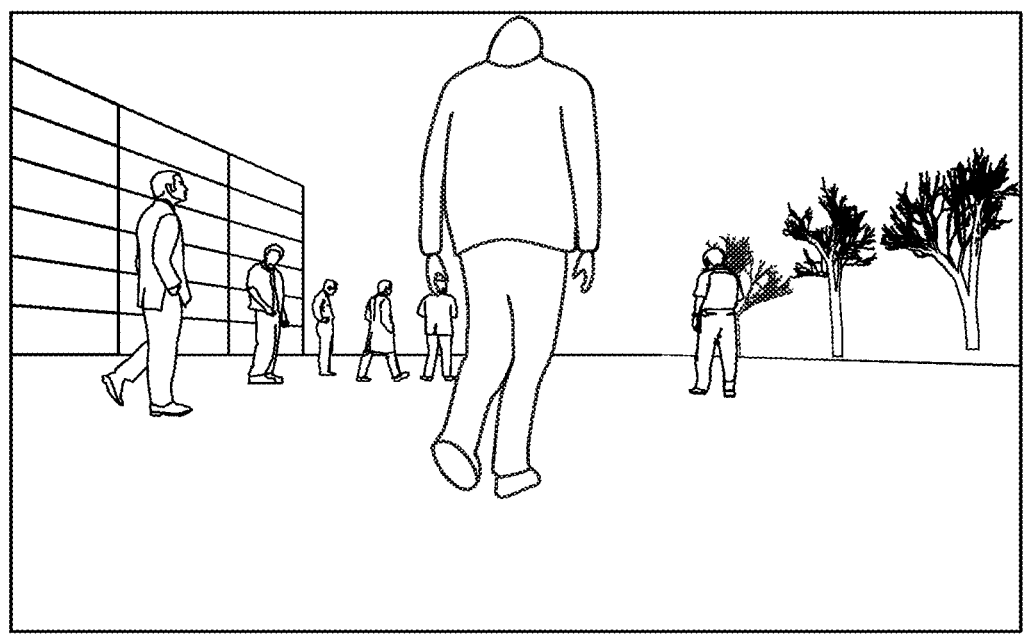
FIG. 2 is a drawing illustrating an example of an image captured by a camera.

For example, images, which show at least one person who is observed from the viewpoint of the robot 100 in a dynamic environment, are captured by the camera 10 (see FIG. 2).

A perspective projection RGB camera may be used as the camera 10, or a fisheye camera or a 360° camera may be used.

The acquiring section 22 acquires time-series data of the images captured by the camera 10.

The tracking section 24 tracks respective persons from the acquired time-series data of the images, and acquires the position and the size of each time of each person in an image.

Figure 3:
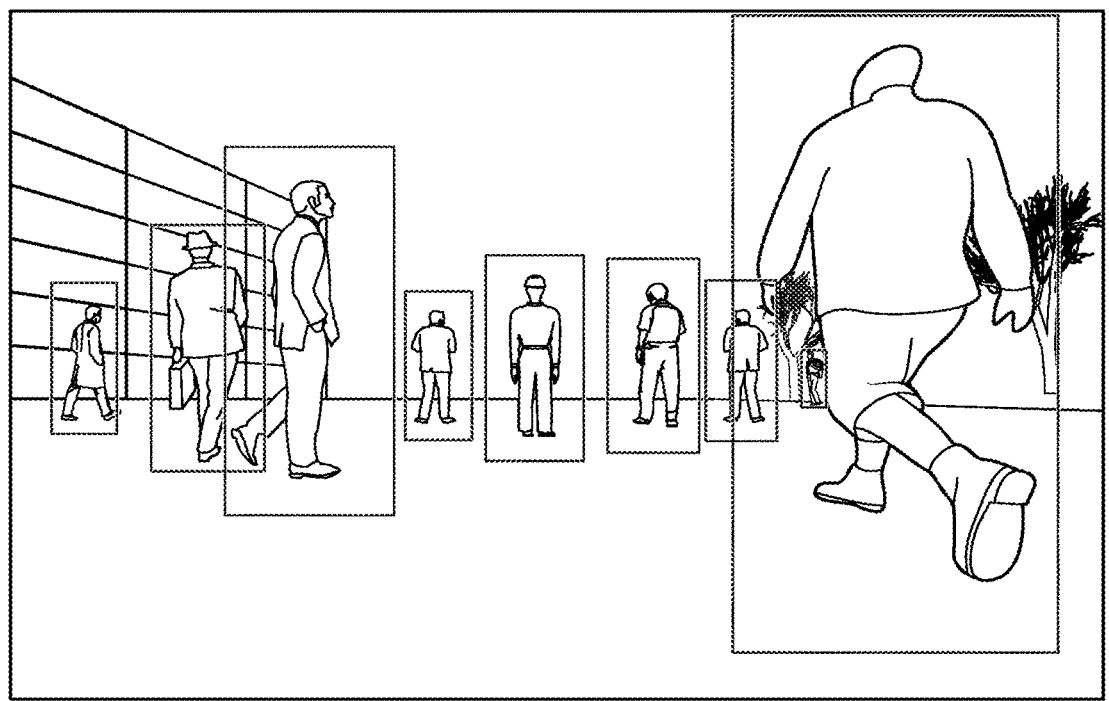
FIG. 3 is a drawing illustrating an example of results of detecting persons from an image.

For example, as illustrated in FIG. 3, for each of the persons in the image, a bounding box that expresses that person is detected and tracked. The central positions (the central positions of the bounding boxes) and the heights (the heights of the bounding boxes) of the persons in the image are acquired at each time.

By using a trained model that estimates the on-ground motion of the robot 100 and the on-ground motions of the respective persons, the generating section 26 generates bird's-eye data, which expresses the on-ground locus of movement of the robot 100 and the on-ground loci of movement of the respective persons, from the positions and sizes at the respective times of the respective persons in the images acquired from the time-series data of the images. The bird's-eye data is data obtained in a case in which the robot 100 is observed from a bird's-eye position.

Specifically, the generating section 26 generates the bird's-eye data by using a trained model that estimates the on-ground motion of the robot 100 and the on-ground motions of the respective persons, by using the positions and sizes at the respective times of the respective persons in the images as input.

Here, the trained model includes a first encoder, a second encoder and a decoder. The first encoder uses the position and size of a target time of each person as input, and outputs vectors. The second encoder uses the on-ground motion of the robot 100 and the on-ground motion of each person, which were obtained for one time previously, as input, and outputs vectors. The decoder uses the vectors outputted by the first encoder and the vectors outputted by the second encoder as input, and outputs the on-ground motion of the robot and the on-ground motions of the respective persons of the target time.

Figure 4:
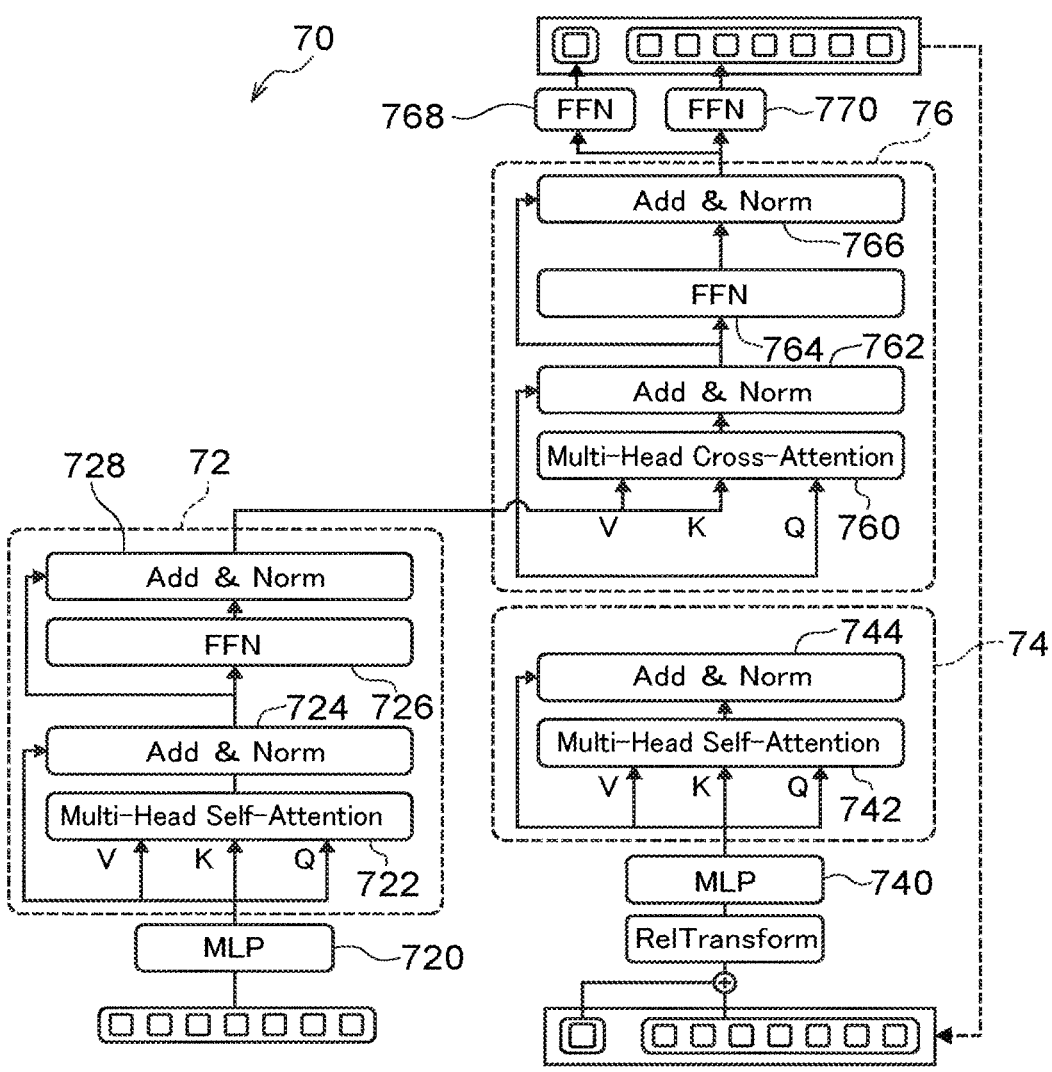
FIG. 4 is a drawing illustrating an example of a trained model.

More specifically, as illustrated in FIG. 4, a trained model 70 has a first encoder 72, a second encoder 74 and a decoder 76.

The first encoder 72 uses the position and size of each person, which the robot 100 observed from a first person viewpoint, as input, and calculates the self-attention between the persons, and outputs the obtained vectors.

Specifically, vectors, which are obtained by inputting to a multilayer perceptron (MLP) 720 vectors that express the positions and sizes at time t of the respective persons in the image, are used as the input vectors of the first encoder 72.

Multihead self-attention layer 722 of the first encoder 72 receives the input vectors of the first encoder 72 as Query, Key, Value respectively, and calculates the self-attention and outputs vectors.

First normalization layer 724 of the first encoder 72 adds the input vectors of the first encoder 72 and the output vectors of the multihead self-attention layer 722, and thereafter, carries out normalization and outputs vectors.

Feedforward neural network 726 uses the output vectors of the first normalization layer 724 as input, and outputs vectors.

A second normalization layer 728 adds the output vectors of the first normalization layer 724 and the output vectors of the feedforward neural network 726, and thereafter, carries out normalization and outputs vectors. These vectors are the output vectors of the first encoder 72. These output vectors express embedding of the first person viewpoint.

The second encoder 74 uses the on-ground motion of the robot 100 and the on-ground motions of the respective persons, which were obtained for one time previously, as input, and encodes the relative positions and speeds of the respective persons with respect to the position of the robot 100, and outputs the obtained vectors.

Specifically, the second encoder 74 determines vectors, which express the on-ground motions of the respective persons with respect to the position of the robot 100, from the on-ground motion of the robot 100 and the on-ground motions of the respective persons that were obtained for time t−1. Vectors, which are obtained by inputting these vectors to a multilayer perceptron 740, are used as the input vectors of the second encoder 74.

Multihead self-attention layer 742 of the second encoder 74 receives the input vectors of the second encoder 74 as Query, Key, Value respectively, and calculates the self-attention and outputs vectors.

Normalization layer 744 of the second encoder 74 adds the input vectors of the second encoder 74 and the output vectors of the multihead self-attention layer 724, and thereafter, carries out normalization and outputs vectors. These vectors express embedding of the bird's-eye viewpoint.

The decoder 76 calculates the cross-attention between the output vectors of the first encoder 72 and the output vectors of the second encoder 74, and outputs the vectors obtained from the results of the cross-attention. These vectors express the results of multihead prediction of the on-ground motion of the robot 100 and the on-ground motions of the respective persons.

Concretely, the output vectors of the first encoder 72 and the output vectors of the second encoder 74 are used as the input of the decoder 76.

Multihead cross-attention layer 760 of the decoder 76 receives the output vectors of the first encoder 72 as Key and Value respectively, and receives the output values of the second encoder 74 as Query, and calculates the cross-attention and outputs vectors.

First normalization layer 762 of the decoder 76 adds the output vectors of the second encoder 74 and the output vectors of the multihead cross-attention layer 760, and thereafter, carries out normalization and outputs vectors.

Feedforward neural network 764 uses the output vectors of the first normalization layer 762 as input, and outputs vectors.

A second normalization layer 766 adds the output vectors of the first normalization layer 762 and the output vectors of the feedforward neural network 764, and thereafter, carries out normalization and outputs vectors. These vectors are the output vectors of the decoder 76.

Feedforward neural network 768 uses the output vectors of the decoder 76 as input, and outputs a vector expressing motion of the robot 100 at time t.

Further, feedforward neural network 770 uses the output vectors of the decoder 76 as input, and outputs vectors expressing motions of the respective persons at time t.

Here, the vectors expressing motions are, for example, vectors expressing the relative position and relative speed with respect to one time previously. Note that the vectors expressing motion may be vectors expressing relative positions with respect to one time previously, or may be vectors expressing relative speeds with respect to one time previously.

In the present embodiment, the generating section 26 generates bird's-eye data by repeating, for each time t, the determination of a vector expressing the on-ground motion of the robot 100 and vectors expressing the on-ground motions of the respective persons at time t, by using the trained model 70. These vectors at time t are determined from vectors expressing positions and sizes at time t of the respective persons in the image, and the vector expressing the on-ground motion of the robot 100 and the vectors expressing the on-ground motions of the respective persons which were obtained for time t−1.

Figure 5:
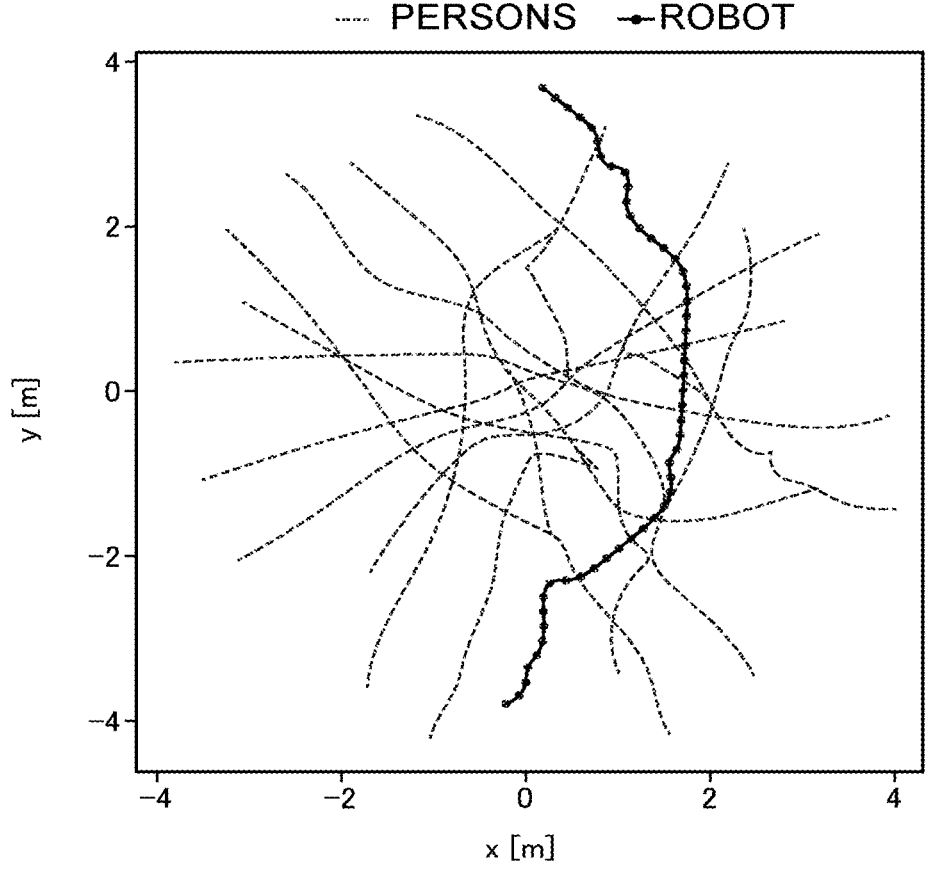
FIG. 5 is a drawing illustrating an example of bird's-eye data.

The generating section 26 generates bird's-eye data such as illustrated in FIG. 5 for example. FIG. 5 illustrates an example showing the on-ground locus of movement of the robot 100 by the line that connects the black dots, and showing the on-ground loci of movement of the persons by the dashed lines.

By using the bird's-eye data, the control section 28 controls the autonomous traveling section 60 such that the robot 100 moves to the destination. For example, the control section 28 designates the moving direction and the speed of the robot 100, and controls the autonomous traveling section 60 such that the robot 100 moves in the designated moving direction and at the designated speed.

Further, by using the bird's-eye data, in a case in which it is judged that an intervening action is necessary, the control section 28 controls the notification section 50 to output a voice message such as "Please clear the way." or to emit a warning noise.

Hardware structures of the bird's-eye data generating device 20 of the robot 100 are described next.

Figure 6:
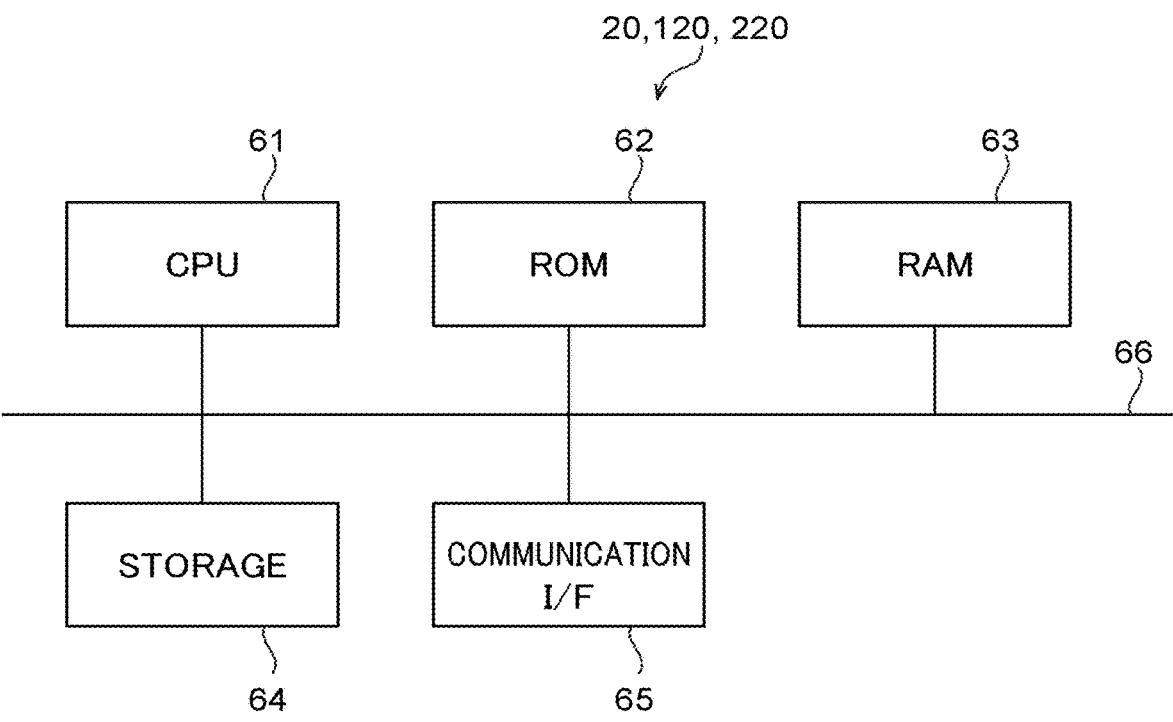
FIG. 6 is a block drawing illustrating hardware structures of a bird's-eye data generating device and a training device relating to the first embodiment and a second embodiment.

As illustrated in FIG. 6, the bird's-eye data generating device 20 has a CPU (Central Processing Unit) 61, a ROM (Read Only Memory) 62, a RAM (Random Access Memory) 63, a storage 64, and a communication interface (I/F) 65. These respective structures are connected so as to be able to communicate with one another via bus 66.

In the present embodiment, a bird's-eye data generating program is stored in the storage 64. The CPU 61 is a central computing processing unit, and executes various programs and controls respective structures. Namely, the CPU 61 reads-out programs from the storage 64, and executes programs by using the RAM 63 as a workspace. The CPU 61 carries out control of the above-described respective structures, and various computing processings, in accordance with programs recorded in the storage 64.

The ROM 62 stores various programs and various data. The RAM 63 temporarily stores programs and data as a workspace. The storage 64 is structured by an HDD (Hard Disk Drive) or an SSD (Solid State Drive), and stores various programs, including the operating system, and various data.

The communication interface 65 is an interface for communicating with other devices, and standards such as, for example, Ethernet®, FDDI or Wi-Fi® are used.

Figure 7:
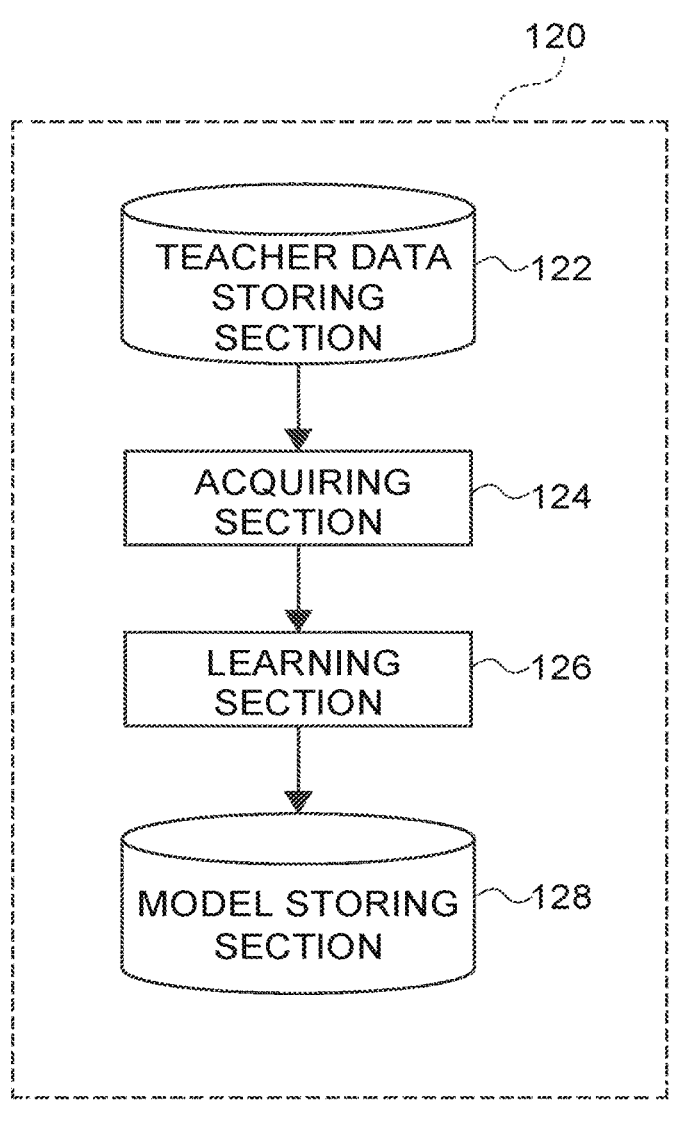
FIG. 7 is a drawing illustrating the schematic structure of the training device relating to the first and second embodiments.

The aforementioned trained model 70 is trained in advance by a training device 120 illustrated in FIG. 7. The training device 120 is described hereinafter.

FIG. 7 is a drawing illustrating the schematic structure of the training device 120 relating to the first embodiment of the technique of the present disclosure. As illustrated in FIG. 7, the training device 120 has a teacher data storing section 122, an acquiring section 124, a learning section 126 and a model storing section 128.

Plural teacher data are stored in the teacher data storing section 122. The teacher data is combinations of time-series data of the positions and sizes at respective times of the respective persons in the images observed from the viewpoint of the robot 100 in a dynamic environment, and time-series data of the on-ground motion of the robot 100 and the on-ground motions of the respective persons.

The acquiring section 124 acquires plural teacher data from the teacher data storing section 122.

On the basis of the plural teacher data, the learning section 126 learns the parameters of a model having a structure similar to that of the trained model 70. When the time-series data of the positions and sizes at respective times of the respective persons in the images of the teacher data is inputted, the parameters of the model are learned such that the model outputs time-series data of the on-ground motion of the robot 100 and the on-ground motions of the respective persons of the teacher data.

The model storing section 128 stores the results of learning by the learning section 126 as a trained model.

Hardware structures of the training device 120 are described next.

As illustrated in above-described FIG. 6, in the same way as the bird's-eye data generating device 20, the training device 120 has the CPU 61, the ROM 62, the RAM 63, the storage 64 and the communication interface 65. These respective structures are connected so as to be able to communicate with one another via the bus 66. In the present embodiment, a training program is stored in the storage 64.

Operation of the training device 120 is described next.

First, plural teacher data are inputted to the training device 120 and are stored in the teacher data storing section 122. The teacher data are combinations of time-series data of the positions and sizes at respective times of the respective persons in the images observed from the viewpoint of the robot 100 in a dynamic environment, and time-series data of the on-ground motion of the robot 100 and the on-ground motions of the respective persons.

Figure 8:
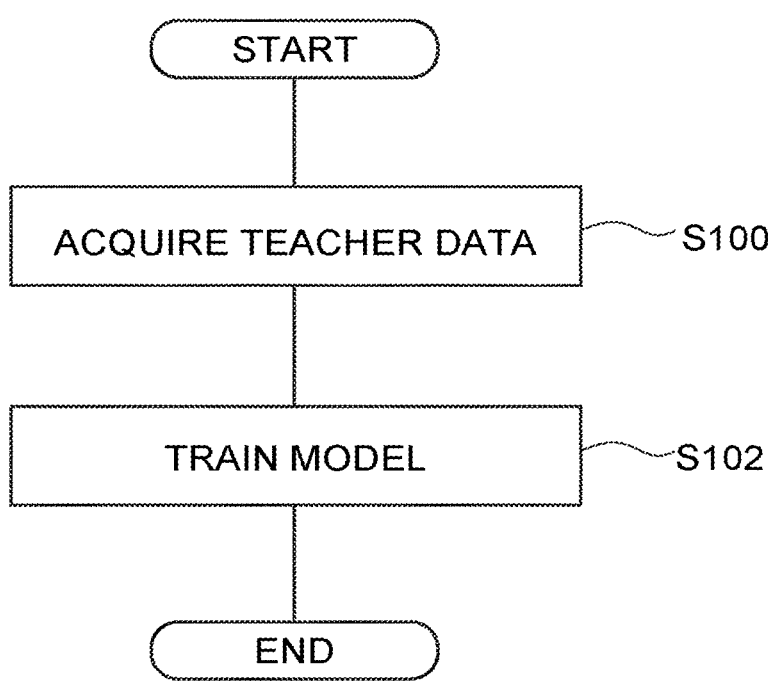
FIG. 8 is a flowchart illustrating the flow of training processing that is carried out by the training device relating to the first and second embodiments.

FIG. 8 is a flowchart illustrating the flow of the training processing by the training device 120. The training processing is carried out due to the CPU 61 reading-out the training program from the storage 64 and expanding and executing the training program in the RAM 63.

In step S100, as the acquiring section 124, the CPU 61 acquires plural teacher data from the teacher data storing section 122.

In step S102, as the learning section 126, on the basis of the plural teacher data, the CPU 61 learns the parameters of a model having a structure similar to that of the trained model 70. When the time-series data of the positions and sizes at respective times of the respective persons in the images of the teacher data is inputted, the parameters of the model are learned such that the model outputs time-series data of the on-ground motion of the robot 100 and the on-ground motions of the respective persons of the teacher data.

Then, the results of learning by the learning section 126 are stored in the model storing section 128 as the trained model.

Operation of the robot 100 is described next.

First, the trained model that was trained by the training device 120 is stored in the model storing section 27 of the bird's-eye data generating device 20.

Then, at the time when the robot 100 moves to its destination by the autonomous traveling section 60, the camera 10 captures images of the periphery of the robot 100 at a predetermined interval. Periodically, the bird's-eye data generating device 20 generates bird's-eye data by the bird's-eye data generating processing illustrated in FIG. 9, and, on the basis of the bird's-eye data, controls the autonomous traveling section 60 such that the robot 100 moves to the destination.

Figure 9:
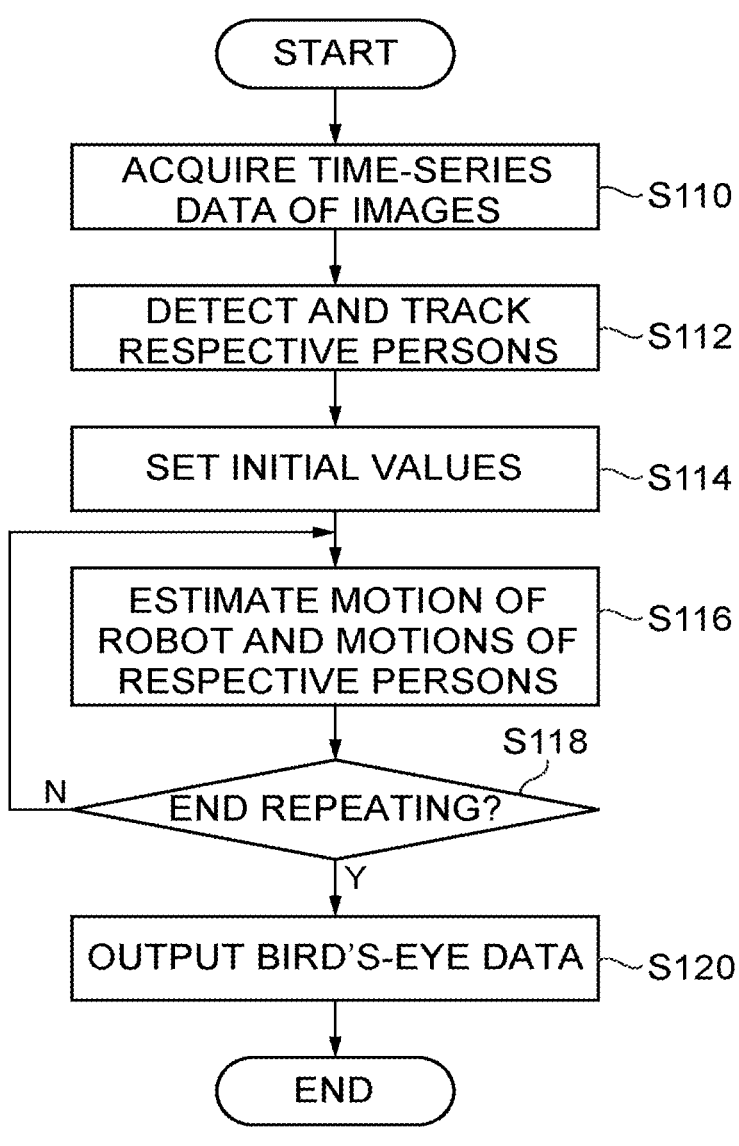
FIG. 9 is a flowchart illustrating the flow of bird's-eye data generating processing that is carried out by the bird's-eye data generating device relating to the first and second embodiments.

FIG. 9 is a flowchart illustrating the flow of bird's-eye data generating processing that is carried out by the bird's-eye data generating device 20. The bird's-eye data generating processing is carried out due to the CPU 61 reading-out the bird's-eye data generating program from the storage 64 and expanding and executing the program in the RAM 63.

In step S110, as the acquiring section 22, the CPU 61 acquires time-series data of the images captured by the camera 10.

In step S112, as the tracking section 24, the CPU 61 tracks the respective persons from the acquired time-series data of the images, and acquires the positions and the sizes at respective times of the respective persons in the images.

In step S114, as the generating section 26, the CPU 61 sets initial values for the vector expressing the on-ground position of the robot 100 and the vectors expressing the on-ground positions of the respective persons, of the one time prior to the initial time of the acquired time-series data of the images. Further, the CPU 61 sets the initial time of the time-series data of the images to be time t.

In step S116, as the generating section 26, by using the trained model 70, the CPU 61 estimates the vector expressing the on-ground motion of the robot 100 and the vectors expressing the on-ground motions of the respective persons at time t. These vectors at time t are estimated from the vectors expressing the positions and sizes at time t of the respective persons in the image, and the vector expressing the on-ground motion of the robot 100 and the vectors expressing the on-ground motions of the respective persons that were acquired for time t–1.

In step S116, as the generating section 26, the CPU 61 judges whether or not a predetermined repeat end condition is satisfied. For example, it suffices to use the arrival of the final time of the time-series data of the images as the repeat end condition. If the repeat end condition is satisfied, the CPU 61 moves on to step S120. On the other hand, if the repeat end condition is not satisfied, the CPU 61 returns to step S116 and repeats processing by using the next time as the time t.

In step S120, as the generating section 26, the CPU 61 generates bird's-eye data that expresses the on-ground position of the robot 100, the observation direction of the camera 10 and the on-ground positions of the respective persons for each time t, and outputs the data to the control section 28, and ends the bird's-eye data generating processing. The bird's-eye data for each time is generated from the vector expressing the on-ground motion of the robot 100 and the vectors expressing the on-ground motions of the respective persons, which were obtained for each time.

By using the generated bird's-eye data, the control section 28 designates the moving direction and speed of the robot 100 so that the robot 100 will move to the destination, and controls the autonomous traveling section 60 such that the robot 100 moves in the designated moving direction and at the designated speed. Further, in a case in which it is judged, by using the bird's-eye data, that an intervening behavior is necessary, the control section 28 controls the notification section 50 to output a voice message such as "Please clear the way." or to emit a warning noise.

In this way, in the present embodiment, bird's-eye data is generated from time-series data of images by using a trained model that estimates on-ground motion of the robot 100 and on-ground motions of respective persons. The bird's-eye data expresses the on-ground locus of movement of the robot 100 and the on-ground loci of movement of the respective persons, which are obtained in a case of observing the robot 100 from a bird's-eye position. Due thereto, even in a situation in which a static landmark is not detected, bird's-eye data, which expresses the on-ground locus of movement of the robot 100 and the on-ground loci of movement of the respective persons, can be generated from images observed in a dynamic environment from the viewpoint of the robot 100 that is equipped with the camera 10.

Further, because this can be realized by calculation using a trained model, there is a small amount of calculation, and the bird's-eye data can be generated in real time.

Further, time-series data of the positions and the sizes at the respective times of the respective persons in the images is used as the teacher data, and therefore, there is no need to use actual images. Due thereto, the load of creating teacher data is lessened.

Second Embodiment

A bird's-eye data generating device relating to a second embodiment is described next. Note that portions that are structured similarly to the first embodiment are denoted by the same reference numerals, and detailed description thereof is omitted.

The second embodiment describes, as an example, a case in which an information processing terminal that is held by a user is provided with the bird's-eye data generating device.

Figure 10:
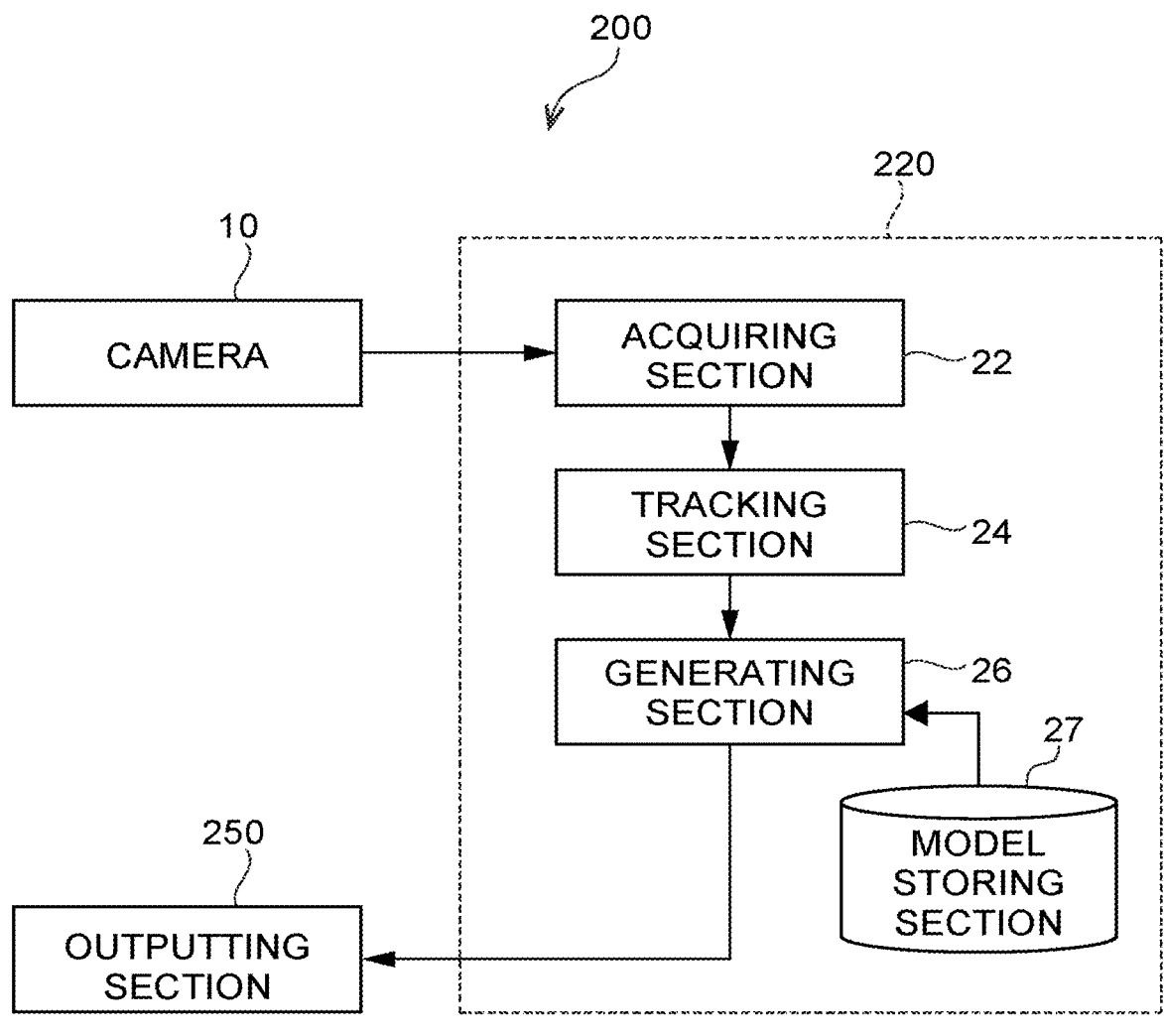
FIG. 10 is a drawing illustrating the schematic structure of an information processing terminal relating to the second embodiment.

FIG. 10 is a drawing illustrating the schematic structure of information processing terminal 200 relating to the second embodiment of the technique of the present disclosure. As illustrated in FIG. 10, the information processing terminal 200 has the camera 10, a bird's-eye data generating device 220 and an outputting section 250. The bird's-eye data generating device 220 has the acquiring section 22, the tracking section 24, the generating section 26 and the model storing section 27. Note that the user is an example of the observing moving body, and the camera 10 is an example of the observation device.

The information processing terminal 200 is held directly by a user, or is installed in a held object (e.g., a suitcase) that a user holds.

The camera 10 captures images of the periphery of the user at a predetermined interval, and outputs the captured images to the acquiring section 22 of the bird's-eye data generating device 220.

By using a trained model that estimates the on-ground motion of the user and the on-ground motions of respective persons, the generating section 26 generates bird's-eye data, which expresses the on-ground locus of movement of the user and the on-ground loci of movement of the respective persons, and outputs the data to the outputting section 250. The bird's-eye data is data obtained in a case of observing the user from a bird's-eye position, from the positions and the sizes at respective times of the respective persons in the images acquired from the time-series data of the images.

The trained model, which estimates the on-ground motion of the user and the on-ground motions of the respective persons and which is trained by the training device 120 in the same way as in the above-described first embodiment, is stored in the model storing section 27.

The outputting section 250 presents the generated bird's-eye data to the user, or transmits the bird's-eye data to a server (not illustrated) via the internet.

Further, the bird's-eye data generating device 220 has hardware structures that are similar to those of the bird's-eye data generating device 20 of the above-described first embodiment, as illustrated in FIG. 6.

Note that, because the other structures and operations of the bird's-eye data generating device 220 are similar to those of the first embodiment, description thereof is omitted.

Further, as illustrated in above-described FIG. 7, the training device 120 relating to the second embodiment has the teacher data storing section 122, the acquiring section 124, the learning section 126 and the model storing section 128.

Plural teacher data are stored in the teacher data storing section 122. The teacher data is combinations of time-series data of the positions and sizes at respective times of the respective persons in the images observed from the viewpoint of the user in a dynamic environment, and time-series data of the on-ground motion of the user and the on-ground motions of the respective persons.

On the basis of the plural teacher data, the learning section 126 learns the parameters of a model having a structure similar to that of the trained model 70. When the time-series data of the positions and sizes at respective times of the respective persons in the images of the teacher data is inputted, the parameters of the model are learned such that the model outputs time-series data of the on-ground motion of the user and the on-ground motions of the respective persons of the teacher data.

Because the other structures and operations of the training device 120 are similar to those of the first embodiment, description thereof is omitted.

In this way, in the present embodiment, bird's-eye data is generated from time-series data of images, by using the trained model that estimates the on-ground motion of the user holding the information processing terminal 200 and the on-ground motions of respective persons. The bird's-eye data expresses the on-ground locus of movement of the user and the on-ground loci of movement of the respective persons, which are obtained in a case of observing the user from a bird's-eye position. Due thereto, even in a situation in which a static landmark is not detected, bird's-eye data, which expresses the on-ground locus of movement of the user and the on-ground loci of movement of the respective persons, can be generated from images observed in a dynamic environment from the viewpoint of the user who is holding the information processing terminal 200 having the camera 10.

The technique of the present disclosure can also be applied to automatic driving vehicles. In this case, the observing moving body is the automatic driving vehicle, the observation device is a camera, laser radar or millimeter wave radar, and the moving bodies are other vehicles, motorcycles, pedestrians and the like.

Third Embodiment

A bird's-eye data generating device relating to a third embodiment is described next. Note that, because the bird's-eye data generating device relating to the third embodiment is structured similarly to the first embodiment, the same reference numerals are used, and detailed description is omitted.

The third embodiment differs from the first embodiment with regard to the point that the distribution of the on-ground motions of the user and the distributions of the on-ground motions of the respective persons are predicted in the third embodiment.

The generating section 26 of the bird's-eye data generating device 20 relating to the third embodiment generates results of predicting bird's-eye data from the positions and sizes at respective times of the respective persons in images acquired from time-series data of the images, by using a trained model that predicts the on-ground motions of the robot 100 and the distributions of the on-ground motions of the respective persons. The bird's-eye data expresses the on-ground locus of movement of the robot 100 and loci of movement expressing the distributions of the on-ground positions of the respective persons, which are obtained in a case in which the robot 100 is observed from a bird's-eye position.

Specifically, the generating section 26 generates results of prediction of bird's-eye data by using a trained model whose input is the positions and sizes at respective times of respective persons in images and that predicts the on-ground motion of the robot 100 and the distributions of the on-ground motions of the respective persons of one time ahead.

Here, the trained model includes a first encoder, a second encoder and a decoder. The first encoder uses the position and size of a target time of each person, and outputs vectors. The second encoder uses the on-ground motion of the robot 100 and the distribution of the on-ground motion of each person, which were obtained for a target time, as input, and outputs vectors. The decoder uses the vectors outputted by the first encoder and the vectors outputted by the second encoder as input, and outputs the on-ground motion of the robot 100 and the distributions of the on-ground motions of the respective persons of one time further ahead than the target time.

More specifically, the first encoder 72 of the trained model 70 uses the positions and sizes of the respective persons, which the robot 100 observed from a first person viewpoint, as input, and calculates the self-attention between the persons, and outputs the obtained vectors.

The second encoder 74 uses the on-ground motion of the robot 100 and the distributions of the on-ground motions of the respective persons, which were obtained for the target time, as input, and encodes the distributions of the relative positions and the distributions of the speeds of the respective persons with respect to the position of the robot 100, and outputs the obtained vectors.

Specifically, the second encoder 74 determines vectors, which express the distributions of the on-ground motions of the respective persons with respect to the position of the robot 100, from the on-ground motion of the robot 100 and the distributions of the on-ground motions of the respective persons that were obtained for time t. Vectors, which are obtained by inputting these vectors to the multilayer perceptron 740, are used as the input vectors of the second encoder 74.

The decoder 76 calculates the cross-attention between the output vectors of the first encoder 72 and the output vectors of the second encoder 74, and outputs the vectors obtained from the results of the cross-attention. These vectors express the results of multihead prediction of the on-ground motion of the robot 100 and the distributions of the on-ground motions of the respective persons.

Here, the vectors expressing the distribution of the motions are, for example, vectors expressing the Gaussian distribution (mean and variance) of the relative position with respect to the target time and the Gaussian distribution (mean and variance) of the relative speed. Note that the vector expressing the distribution of the motions may be a vector expressing the Gaussian distribution (mean and variance) of the relative position with respect to the target time or a vector expressing the Gaussian distribution (mean and variance) of the relative speed with respect to the target time.

In the present embodiment, the generating section 26 generates results of prediction of bird's-eye data by repeating, for each time t, the determination of a vector expressing the on-ground motion of the robot 100 and vectors expressing the distributions of the on-ground motions of the respective persons at time t+1, by using the trained model 70. The vectors at time t+1 are determined from the vectors expressing the positions and sizes at time t of the respective persons in the images, and the vector expressing the on-ground motion of the robot 100 and the vectors expressing the distributions of the on-ground motions of the respective persons which were obtained for time t.

Figure 11A:
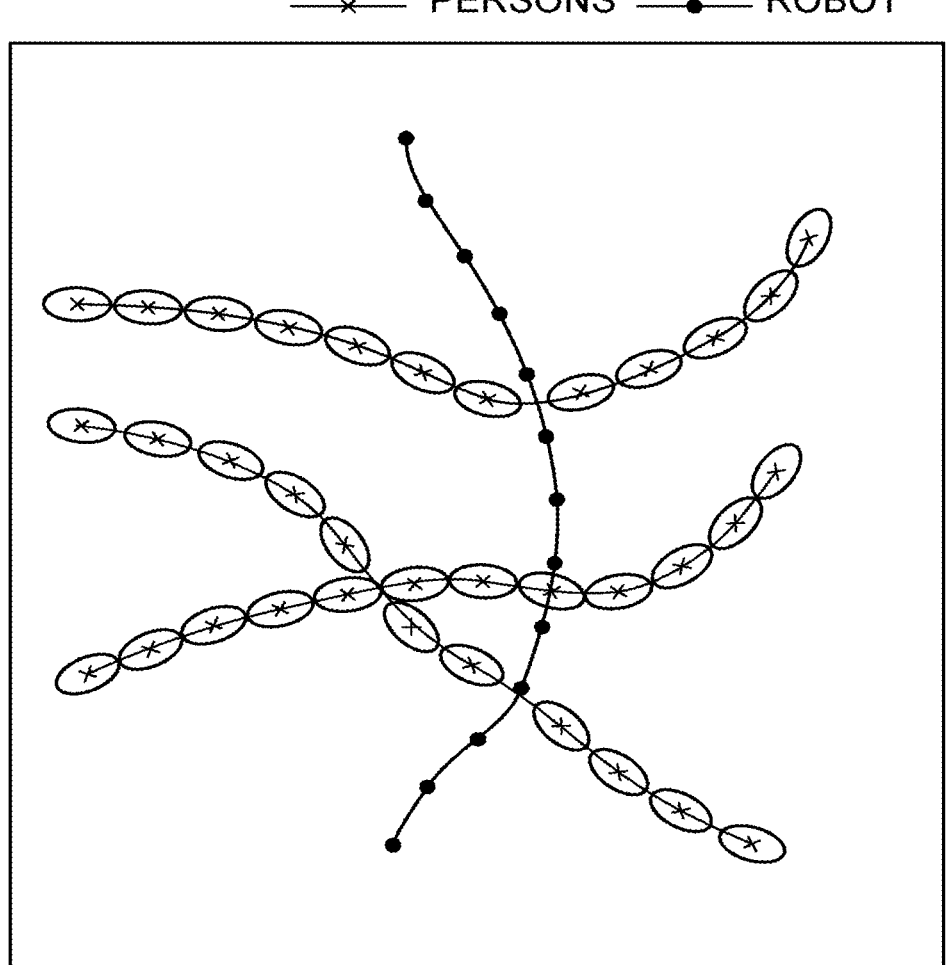
FIG. 11A is a drawing illustrating an example of bird's-eye data.

The generating section 26 generates the results of predicting bird's-eye data such as illustrated in FIG. 11A for example. FIG. 11A illustrates the on-ground locus of movement of the robot 100 by the line that connects the black dots expressing positions determined from a relative position. Further, FIG. 11A illustrates an example in which the on-ground loci of movement of the respective persons are shown by lines connecting the X marks that represent average positions determined from the averages of the relative positions, and the distributions of the positions determined from the distributions of the relative positions are shown by the ovals surrounding the X marks. The ovals representing the distributions may be circles, or may be displayed in different colors expressing the distributions of the contour lines or the heights. Further, the positions of the robot 100 include errors in the control of the robot 100 and the sensor specifying the position. Therefore, calculation may be carried out so as to include the distribution of this uncertainty, and this may be displayed together with the distributions.

Figure 11B:
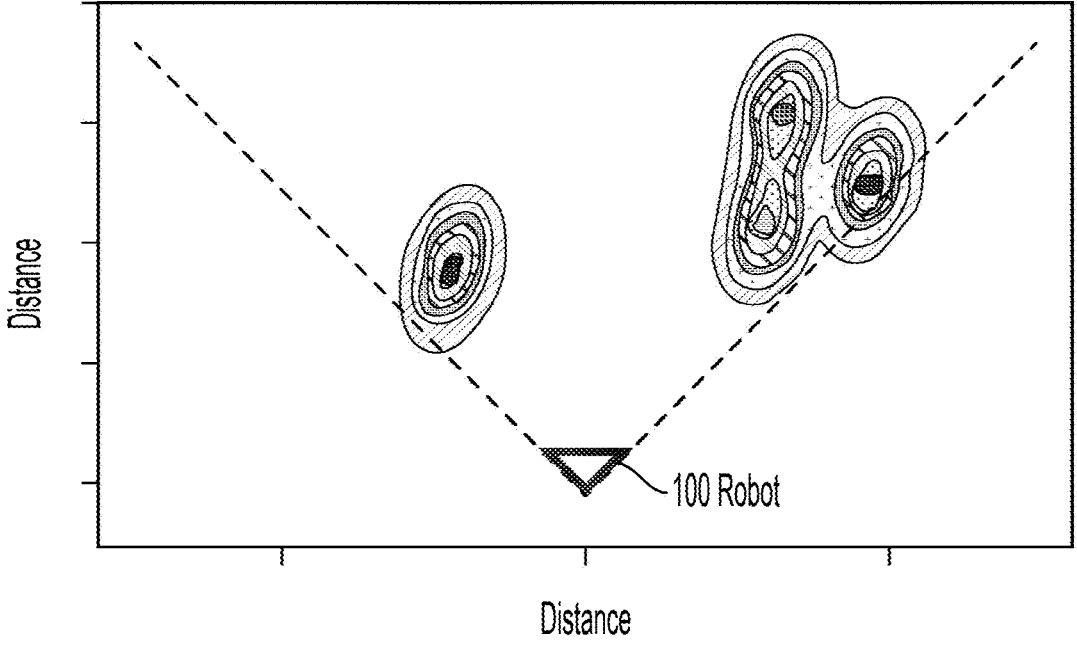
FIG. 11B is a drawing illustrating another example of bird's-eye data.

Further, bird's-eye data expressing the distributions of the on-ground positions of the respective persons at the next time, such as illustrated in FIG. 11B, may be generated. In FIG. 11B, distance is shown on the vertical axis and the horizontal axis, and an example of a bird's-eye diagram that includes the distributions of the positions of the robot (the upside-down triangle) and the persons is illustrated. The ovals of the contour lines show the positions of the persons along with the distributions of the uncertainty, and the dashed lines show the visual field of the camera of the robot 100. The example of FIG. 11B is a drawing illustrating information within the robot 100, and therefore, the position of the robot is fixed (there is no distribution of uncertainty), and only the persons have distributions of uncertainty.

By using the bird's-eye data, the control section 28 controls the autonomous traveling section 60 such that the robot does not collide with persons and the robot 100 moves to the destination. For example, the control section 28 designates the moving direction and the speed of the robot 100, and controls the autonomous traveling section 60 such that the robot 100 moves in the designated moving direction and at the designated speed. At this time, collisions between the robot 100 and persons can be avoided more by specifying the moving direction and the speed of the robot 100 such that the robot 100 avoids the oval ranges of the bird's-eye data of above-described FIG. 11.

Plural teacher data are stored in the teacher data storing section 122 of the training device 120 relating to the third embodiment. The teacher data is combinations of time-series data of the positions and sizes at respective times of the respective persons in the images observed from the viewpoint of the robot 100 in a dynamic environment, and time-series data of the on-ground motion of the robot 100 and the on-ground motions of the respective persons. Here, in the teacher data, the positions and sizes at a given time of the respective persons in an image observed from the viewpoint of the user in a dynamic environment, and the on-ground motions of the respective persons at the next time, are set in correspondence with one another.

The acquiring section 124 acquires plural teacher data from the teacher data storing section 122.

On the basis of the plural teacher data, the learning section 126 learns the parameters of a model having a structure similar to that of the trained model 70. When the time-series data of the positions and sizes at respective times of the respective persons in the images of the teacher data is inputted, the parameters of the model are learned such that the model outputs time-series data of the motions corresponding to the on-ground motions of the robot 100 of the teacher data and time-series data of the distributions of the motions corresponding to the on-ground motions of the respective persons of the teacher data.

The results of learning by the learning section 126 are stored in the model storing section 128 as a trained model.

Note that, because the other structures and operations of the bird's-eye data generating device 20 and training device 120 relating to the third embodiment are similar to those of the first embodiment, description thereof is omitted.

In this way, in accordance with the present embodiment, results of prediction of bird's-eye data are generated from time-series data of images, by using a trained model that predicts the on-ground motion of the next time of the robot 100 and the on-ground motions of the next time of the respective persons. The bird's-eye data express the on-ground locus of movement of the robot 100 and the on-ground loci of movement of the respective persons, which are obtained in a case in which the robot 100 is observed from a bird's-eye position. Due thereto, even in a situation in which a static landmark is not detected, results of prediction of bird's-eye data, which expresses the on-ground locus of movement of the robot 100 and the on-ground loci of movement of the respective persons, can be generated from images observed in a dynamic environment from the viewpoint of the robot 100 that is equipped with the camera 10.

Example

An Example of generating bird's-eye data from time-series data of images by the bird's-eye data generating device 20 of the above-described first embodiment is described.

As a Comparative Example, there is used a method that generates bird's-eye data so as to maximize the posterior distributions of the on-ground positions of the robot and the respective persons that are expressed by using the relative positions of the persons from the robot of each time and a motion model. These posterior distributions are posterior distributions to which have been provided the on-ground positions of the robot and the respective persons of one time before and the positions and sizes of the respective persons in the image of the current time.

The amounts of calculation with respect to databases of different scenes that were "Hotel", "ETH" and "Students" were measured. Further, a CPU was used in the Comparative Example, and in the Examples, the amounts of calculation were measured in cases in which a CPU and a GPU were used. The results of measurement of the amounts of calculation are shown in Table 1.

TABLE 1

| method | dev | Hotel | ETH | Student |
|---|---|---|---|---|
| GeoVB | CPU | 5.02 [s] | 6.88 [s] | 42.1 [s] |
| ViewBirdiformer | CPU | 4.20 [ms] | 4.56 [ms] | 28.3 [ms] |
| ViewBirdiformer | GPU | 2.82 [ms] | 2.17 [ms] | 2.94 [ms] |

As shown in Table 1, it can be understood that the amounts of calculation were low in the Examples (ViewBirdiformer) as compared with the Comparative Example (GeoVB). Further, it can be understood that the amount of calculation was lower when a GPU was used as the device.

Modified Examples

Note that the above embodiments describe cases in which the robot 100 or the information processing terminal 200 has the bird's-eye data generating device 20, 220, but the functions of the bird's-eye data generating device 20, 220 may be provided at an external server. In this case, the robot 100 or the information processing terminal 200 transmits the time-series data of the images captured by the camera 10 to the external server. The external server generates bird's-eye data from the transmitted time-series data of the images, and transmits the data to the robot 100 or the information processing terminal 200.

Further, under the condition that a static landmark is detected from the images captured by the camera 10, the generating section 26 may generate bird's-eye data by using the static landmark shown in the images. For example, the technique of the above-described Non-Patent Document 2 may be used. In this case, under the condition that a static landmark is detected from images captured by the camera 10, the bird's-eye data may be generated by using the static landmark shown in the images, and, under the condition that a static landmark is not detected from images captured by the camera 10 (e.g., in a crowded environment), the bird's-eye data may be generated by a method described in the above embodiments. Further, bird's-eye data that is generated by using a static landmark shown in the images, and bird's-eye data that is generated by a method described in the above embodiments, may be integrated.

Figure 12:
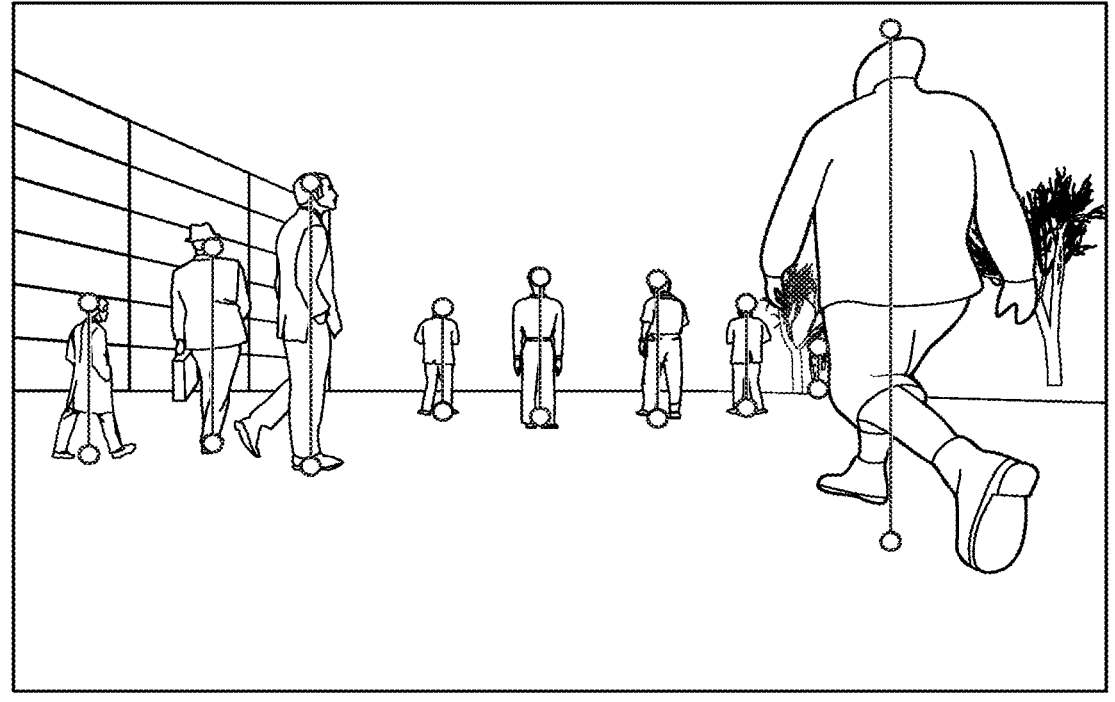
FIG. 12 is a drawing illustrating an example of results of detecting persons from an image.

Further, as an example, a case has been described in which, for each of the persons in the images, the tracking section 24 detects and tracks bounding boxes expressing the persons, and acquires at each time the central positions (the central positions of the bounding boxes) and the heights (the heights of the bounding boxes) of the persons in the images. However, the tracking section 24 is not limited to this. For example, for each of the respective persons in the images, the tracking section 24 may detect and track the skeleton of a person that represents that person, and may acquire at each time the central positions (the central positions of the skeletons of the persons) and the heights (the heights of the skeletons of the persons) of the person in the images. Further, as illustrated in FIG. 12, for each of the respective persons in the images, the tracking section 24 may detect and track a line expressing a height that represents that person, and may acquire at each time the central positions (the central positions of the lines) and the heights (the heights of the lines) of the persons in the images.

Further, a case in which the two-dimensional observation information is images has been described as an example, but the two-dimensional observation information is not limited to this. For example, if the observation device is an event camera, for each pixel, data having a pixel value corresponding to motion may be used as the two-dimensional observation information.

Further, a case in which the moving body that is expressed by the bird's-eye data is a person has been described as an example, but the technique of the present disclosure is not limited to this. For example, the moving body expressed by the bird's-eye data may be a personal mobility device such as a bicycle or a vehicle.

Further, in the above-described first embodiment, in the same way as in the third embodiment, the bird's-eye data may be generated from time-series data of two-dimensional observation information, by using the trained model that estimates the on-ground motion of the robot and the distributions of the on-ground motions of the respective persons. The bird's-eye data expresses the on-ground locus of movement of the robot and loci of movement expressing the distributions of the on-ground positions of the respective persons, which are obtained in a case of observing the robot from a bird's-eye position.

Further, the bird's-eye data generating processing and training processing, which are executed by the CPU reading-in software (programs) in the above-described respective embodiments, may be executed by any of various types of processors other than a CPU. Examples of processors in this case include PLDs (Programmable Logic Devices) whose circuit structure can be changed after production such as FPGAs (Field-Programmable Gate Arrays), and dedicated electrical circuits that are processors having circuit structures that are designed for the sole purpose of executing specific processings such as ASICs (Application Specific Integrated Circuits). Further, the bird's-eye data generating processing and the training processing may be executed by one of these various types of processors, or may be executed by a combination of two or more of the same type or different types of processors (e.g., plural FPGAs, or a combination of a CPU and an FPGA). Further, the hardware structures of these various types of processors are, more specifically, electrical circuits that combine circuit elements such as semiconductor elements.

Further, the above embodiments describe an aspect in which the bird's-eye data generating program and the training program are stored in advance in the storage 64, but the technique of the present disclosure is not limited to this. The programs may be provided in forms of being recorded on a recording medium such as a CD-ROM (Compact Disc Read Only Memory), a DVD-ROM (Digital Versatile Disc Read Only Memory), or a USB (Universal Serial Bus) memory. Further, the programs may be in forms of being downloaded from an external device over a network.

The following notes are further disclosed in relation to the above-described embodiments.

[Note 1]

A bird's-eye data generating device including:

an acquiring section acquiring time-series data of two-dimensional observation information expressing at least one moving body observed in a dynamic environment from a viewpoint of an observing moving body equipped with an observation device; and a generating section generating bird's-eye data expressing an on-ground locus of movement of the observing moving body and on-ground loci of movement of the respective moving bodies that are obtained in a case in which the observing moving body is observed from a bird's-eye position, from the time-series data of the two-dimensional observation information and by using a trained model that estimates on-ground motion of the observing moving body and on-ground motions of the respective moving bodies.

[Note 2]

The bird's-eye data generating device of Note 1, wherein the generating section generates bird's-eye data, which expresses the on-ground locus of movement of the observing moving body and loci of movement expressing distributions of on-ground positions of the respective moving bodies that are obtained in a case in which the observing moving body is observed from a bird's-eye position, from the time-series data of the two-dimensional observation information and by using a trained model that estimates the on-ground motion of the observing moving body and distributions of the on-ground motions of the respective moving bodies.

[Note 3]

The bird's-eye data generating device of Note 1 or 2, further including a tracking section tracking the respective moving bodies from the time-series data of the two-dimensional observation information, and acquiring positions and sizes of the respective moving bodies at respective times in the two-dimensional observation information, wherein the generating section generates the bird's-eye data by using the trained model whose input is positions and sizes of the respective moving bodies at respective times in the two-dimensional observation information and that estimates the on-ground motion of the observing moving body and the on-ground motions of the respective moving bodies.

[Note 4]

The bird's-eye data generating device of Note 3, wherein the trained model includes a first encoder whose input is the positions and sizes of the respective moving bodies at a target time, and that outputs vectors, a second encoder whose input is the on-ground motion of the observing moving body and the on-ground motions of the respective moving bodies that were obtained for one time previously, and that outputs vectors, and a decoder whose input is the vectors outputted by the first encoder and the vectors outputted by the second encoder, and that outputs on-ground motion of the observing moving body and on-ground motions of the respective moving bodies of the target time.

[Note 5]

A training device including:

an acquiring section acquiring, as teacher data, combinations of time-series data of positions and sizes of respective moving bodies at respective times in two-dimensional observation information expressing at least one moving body observed in a dynamic environment from a viewpoint of an observing moving body equipped with an observation device, and time-series data of on-ground motion of the observing moving body and on-ground motions of the respective moving bodies; and a training section that, on the basis of the teacher data, trains a model whose input is the positions and sizes of the respective moving bodies at respective times in the two-dimensional observation information and that estimates on-ground motion of the observing moving body and on-ground motions of the respective moving bodies.

[Note 6]

The training device of Note 5, wherein the model includes a first encoder whose input is the positions and sizes of the respective moving bodies at a target time, and that outputs vectors, a second encoder whose input is the on-ground motion of the observing moving body and the on-ground motions of the respective moving bodies that were obtained for one time previously, and that outputs vectors, and a decoder whose input is the vectors outputted by the first encoder and the vectors outputted by the second encoder, and that outputs on-ground motion of the observing moving body and on-ground motions of the respective moving bodies of the target time.

[Note 7]

A bird's-eye data generating device including:

an acquiring section acquiring time-series data of two-dimensional observation information expressing at least one moving body observed in a dynamic environment from a viewpoint of an observing moving body equipped with an observation device; and a generating section generating results of predicting bird's-eye data expressing an on-ground locus of movement of the observing moving body and on-ground loci of movement of respective moving bodies that are obtained in a case in which the observing moving body is observed from a bird's-eye position, from the time-series data of the two-dimensional observation information and by using a trained model that predicts on-ground motion of the observing moving body and on-ground motions of the respective moving bodies.

[Note 8]

The bird's-eye data generating device of Note 7, wherein the generating section generates the results of predicting bird's-eye data, which expresses the on-ground locus of movement of the observing moving body and loci of movement expressing distributions of on-ground positions of the respective moving bodies that are obtained in a case in which the observing moving body is observed from a bird's-eye position, from the time-series data of the two-dimensional observation information and by using a trained model that predicts the on-ground motion of the observing moving body and distributions of the on-ground motions of the respective moving bodies.

[Note 9]

A bird's-eye data generating program for causing a computer to execute processings including:

an acquiring step of acquiring time-series data of two-dimensional observation information expressing at least one moving body observed in a dynamic environment from a viewpoint of an observing moving body equipped with an observation device; and a generating step of generating bird's-eye data expressing an on-ground locus of movement of the observing moving body and on-ground loci of movement of the respective moving bodies that are obtained in a case in which the observing moving body is observed from a bird's-eye position, from the time-series data of the two-dimensional observation information and by using a trained model that estimates on-ground motion of the observing moving body and on-ground motions of the respective moving bodies.

[Note 10]

A bird's-eye data generating method in which a computer executes processings including:

an acquiring step of acquiring time-series data of two-dimensional observation information expressing at least one moving body observed in a dynamic environment from a viewpoint of an observing moving body equipped with an observation device; and a generating step of generating bird's-eye data expressing an on-ground locus of movement of the observing moving body and on-ground loci of movement of the respective moving bodies that are obtained in a case in which the observing moving body is observed from a bird's-eye position, from the time-series data of the two-dimensional observation information and by using a trained model that estimates on-ground motion of the observing moving body and on-ground motions of the respective moving bodies.

[Note 11]

A robot including:

an acquiring section acquiring time-series data of two-dimensional observation information expressing at least one moving body observed in a dynamic environment from a viewpoint of a robot equipped with an observation device;

a generating section generating bird's-eye data expressing an on-ground locus of movement of the robot and on-ground loci of movement of the respective moving bodies that are obtained in a case in which the robot is observed from a bird's-eye position, from the time-series data of the two-dimensional observation information and by using a trained model that estimates on-ground motion of the robot and on-ground motions of the respective moving bodies;

an autonomous traveling section causing the robot to travel autonomously; and a control section that, by using the bird's-eye data, controls the autonomous traveling section such that the robot moves to a destination.

[Note 12]

A bird's-eye data generating program for causing a computer to execute processings including:

an acquiring step of acquiring time-series data of two-dimensional observation information expressing at least one moving body observed in a dynamic environment from a viewpoint of an observing moving body equipped with an observation device; and a generating step of generating results of predicting bird's-eye data expressing an on-ground locus of movement of the observing moving body and on-ground loci of movement of respective moving bodies that are obtained in a case in which the observing moving body is observed from a bird's-eye position, from the time-series data of the two-dimensional observation information and by using a trained model that predicts on-ground motion of the observing moving body and on-ground motions of the respective moving bodies.

[Note 13]

A bird's-eye data generating method in which a computer executes processings including:

an acquiring step of acquiring time-series data of two-dimensional observation information expressing at least one moving body observed in a dynamic environment from a viewpoint of an observing moving body equipped with an observation device; and a generating step of generating results of predicting bird's-eye data expressing an on-ground locus of movement of the observing moving body and on-ground loci of movement of respective moving bodies that are obtained in a case in which the observing moving body is observed from a bird's-eye position, from the time-series data of the two-dimensional observation information and by using a trained model that predicts on-ground motion of the observing moving body and on-ground motions of the respective moving bodies.

[Note 14]

A robot including:

an acquiring section acquiring time-series data of two-dimensional observation information expressing at least one moving body observed in a dynamic environment from a viewpoint of a robot equipped with an observation device;

a generating section generating results of predicting bird's-eye data expressing an on-ground locus of movement of the robot and on-ground loci of movement of respective moving bodies that are obtained in a case in which the robot is observed from a bird's-eye position, from the time-series data of the two-dimensional observation information and by using a trained model that predicts on-ground motion of the robot and on-ground motions of the respective moving bodies;

an autonomous traveling section causing the robot to travel autonomously; and a control section that, by using the results of predicting the bird's-eye data, controls the autonomous traveling section such that the robot moves to a destination.

21

[Note 15]

A bird's-eye data generating device including:

a memory; and at least one processor connected to the memory, wherein the processor acquires time-series data of two-dimensional observation information expressing at least one moving body observed in a dynamic environment from a viewpoint of an observing moving body equipped with an observation device, and generates bird's-eye data expressing an on-ground locus of movement of the observing moving body and on-ground loci of movement of the respective moving bodies that are obtained in a case in which the observing moving body is observed from a bird's-eye position, from the time-series data of the two-dimensional observation information and by using a trained model that estimates on-ground motion of the observing moving body and on-ground motions of the respective moving bodies.

[Note 16]

A non-transitory storage medium storing a program executable by a computer to execute bird's-eye data generating processing, wherein the bird's-eye data generating processing acquires time-series data of two-dimensional observation information expressing at least one moving body observed in a dynamic environment from a viewpoint of an observing moving body equipped with an observation device, and generates bird's-eye data expressing an on-ground locus of movement of the observing moving body and on-ground loci of movement of the respective moving bodies that are obtained in a case in which the observing moving body is observed from a bird's-eye position, from the time-series data of the two-dimensional observation information and by using a trained model that estimates on-ground motion of the observing moving body and on-ground motions of the respective moving bodies.

[Note 17]

A training device including:

a memory; and at least one processor connected to the memory, wherein the processor acquires, as teacher data, combinations of time-series data of positions and sizes of respective moving bodies at respective times in two-dimensional observation information expressing at least one moving body observed in a dynamic environment from a viewpoint of an observing moving body equipped with an observation device, and time-series data of on-ground motion of the observing moving body and on-ground motions of the respective moving bodies, and on the basis of the teacher data, trains a model whose input is the positions and sizes of the respective moving bodies at respective times in the two-dimensional observation information and that estimates on-ground motion of the observing moving body and on-ground motions of the respective moving bodies.

[Note 18]

A non-transitory storage medium storing a program executable by a computer to execute training processing, wherein the training processing acquires, as teacher data, combinations of time-series data of positions and sizes of respective moving bodies at respective times in two-dimensional observation information expressing at least one moving body observed in a dynamic environment from a viewpoint of an observing moving body equipped with an observation device, and time-series data of on-ground motion of the observing moving body and on-ground motions of the respective moving bodies, and on the basis of the teacher data, trains a model whose input is the positions and sizes of the respective moving bodies at respective times in the two-dimensional observation information and that estimates on-ground motion of the observing moving body and on-ground motions of the respective moving bodies.

[Note 19]

A bird's-eye data generating device including:

a memory; and at least one processor connected to the memory, wherein the processor acquires time-series data of two-dimensional observation information expressing at least one moving body observed in a dynamic environment from a viewpoint of an observing moving body equipped with an observation device, and generates results of predicting bird's-eye data expressing an on-ground locus of movement of the observing moving body and on-ground loci of movement of respective moving bodies that are obtained in a case in which the observing moving body is observed from a bird's-eye position, from the time-series data of the two-dimensional observation information and by using a trained model that predicts on-ground motion of the observing moving body and on-ground motions of the respective moving bodies.

[Note 20]

A non-transitory storage medium storing a program executable by a computer to execute bird's-eye data generating processing, wherein the bird's-eye data generating processing acquires time-series data of two-dimensional observation information expressing at least one moving body observed in a dynamic environment from a viewpoint of an observing moving body equipped with an observation device, and generates results of predicting bird's-eye data expressing an on-ground locus of movement of the observing moving body and on-ground loci of movement of respective moving bodies that are obtained in a case in which the observing moving body is observed from a bird's-eye position, from the time-series data of the two-dimensional observation information and by using a trained model that predicts on-ground motion of the observing moving body and on-ground motions of the respective moving bodies.

The disclosures of Japanese Patent Application No. 2022-039936 and Japanese Patent Application No. 2023-022034 are, in their entireties, incorporated by reference into the present specification.

All publications, patent applications, and technical standards mentioned in the present specification are incorporated by reference into the present specification to the same extent as if such individual publication, patent application, or technical standard was specifically and individually indicated to be incorporated by reference.

The invention claimed is:

1. A bird's-eye data generating device comprising:

a memory; and at least one processor coupled to the memory, the at least one processor being configured to:

acquire time-series data of two-dimensional observation information expressing at least one moving body observed in a dynamic environment from a viewpoint of an observing moving body equipped with an observation device;

generate bird's-eye data expressing an on-ground locus of movement of the observing moving body and on-ground loci of movement of respective moving bodies that are obtained in a case in which the observing moving body is observed from a bird's-eye position, from the time-series data of the two-dimensional observation information and by using a trained model that estimates on-ground motion of the observing moving body and on-ground motions of the respective moving bodies, wherein the trained model includes:

a first encoder whose input is the positions and sizes of the respective moving bodies at a target time, and that outputs vectors, a second encoder whose input is the on-ground motion of the observing moving body and the on-ground motions of the respective moving bodies that were obtained for one time previously, and that outputs vectors, and a decoder whose input is the vectors outputted by the first encoder and the vectors outputted by the second encoder, and that outputs on-ground motion of the observing moving body and on-ground motions of the respective moving bodies of the target time; control, by using the generated bird's-eye data, a robot moves to a destination.

2. The bird's-eye data generating device of claim 1, wherein the at least one processor generates bird's-eye data, which expresses the on-ground locus of movement of the observing moving body and loci of movement expressing distributions of on-ground positions of the respective moving bodies that are obtained in a case in which the observing moving body is observed from a bird's-eye position, from the time-series data of the two-dimensional observation information and by using a trained model that estimates the on-ground motion of the observing moving body and distributions of the on-ground motions of the respective moving bodies.

3. The bird's-eye data generating device of claim 1, wherein the at least one processor is further configured to track the respective moving bodies from the time-series data of the two-dimensional observation information, and acquire positions and sizes of the respective moving bodies at respective times in the two-dimensional observation information, and wherein the at least one processor generates the bird's-eye data by using the trained model whose input is positions and sizes of the respective moving bodies at respective times in the two-dimensional observation information and that estimates the on-ground motion of the observing moving body and the on-ground motions of the respective moving bodies.

4. A non-transitory storage medium storing a program executable by a computer so as to execute bird's-eye data generating processing, the bird's-eye data generating processing including:

acquiring time-series data of two-dimensional observation information expressing at least one moving body observed in a dynamic environment from a viewpoint of an observing moving body equipped with an observation device;

generating bird's-eye data expressing an on-ground locus of movement of the observing moving body and on-ground loci of movement of respective moving bodies that are obtained in a case in which the observing moving body is observed from a bird's-eye position, from the time-series data of the two-dimensional observation information and by using a trained model that estimates on-ground motion of the observing moving body and on-ground motions of the respective moving bodies, wherein the trained model includes:

a first encoder whose input is the positions and sizes of the respective moving bodies at a target time, and that outputs vectors, a second encoder whose input is the on-ground motion of the observing moving body and the on-ground motions of the respective moving bodies that were obtained for one time previously, and that outputs vectors, and a decoder whose input is the vectors outputted by the first encoder and the vectors outputted by the second encoder, and that outputs on-ground motion of the observing moving body and on-ground motions of the respective moving bodies of the target time; and controlling, by using the generated bird's-eye data, a robot moves to a destination.

5. A bird's-eye data generating method in which a computer executes processing comprising:

acquiring time-series data of two-dimensional observation information expressing at least one moving body observed in a dynamic environment from a viewpoint of an observing moving body equipped with an observation device;

generating bird's-eye data expressing an on-ground locus of movement of the observing moving body and on-ground loci of movement of respective moving bodies that are obtained in a case in which the observing moving body is observed from a bird's-eye position, from the time-series data of the two-dimensional observation information and by using a trained model that estimates on-ground motion of the observing moving body and on-ground motions of the respective moving bodies, wherein the trained model includes:

a first encoder whose input is the positions and sizes of the respective moving bodies at a target time, and that outputs vectors, a second encoder whose input is the on-ground motion of the observing moving body and the on-ground motions of the respective moving bodies that were obtained for one time previously, and that outputs vectors, and a decoder whose input is the vectors outputted by the first encoder and the vectors outputted by the second encoder, and that outputs on-ground motion of the observing moving body and on-ground motions of the respective moving bodies of the target time; and controlling, by using the generated bird's-eye data, a robot moves to a destination.

6. A robot comprising:

an acquiring section acquiring time-series data of two-dimensional observation information expressing at least one moving body observed in a dynamic environment from a viewpoint of a robot equipped with an observation device;

a generating section generating bird's-eye data expressing an on-ground locus of movement of the robot and on-ground loci of movement of respective moving bodies that are obtained in a case in which the robot is observed from a bird's-eye position, from the time-series data of the two-dimensional observation information and by using a trained model that estimates on-ground motion of the robot and on-ground motions of the respective moving bodies, wherein the trained model includes:

a first encoder whose input is the positions and sizes of the respective moving bodies at a target time, and that outputs vectors, a second encoder whose input is the on-ground motion of the observing moving body and the on-ground motions of the respective moving bodies that were obtained for one time previously, and that outputs vectors, and a decoder whose input is the vectors outputted by the first encoder and the vectors outputted by the second encoder, and that outputs on-ground motion of the observing moving body and on-ground motions of the respective moving bodies of the target time;

an autonomous traveling section causing the robot to travel autonomously; and a control section that, by using the bird's-eye data, controls the autonomous traveling section such that the robot moves to a destination.

\* \* \* \* \*